United States Patent
Melwitz et al.

(10) Patent No.: US 6,861,085 B2
(45) Date of Patent: Mar. 1, 2005

(54) PROCESS FOR PREPARING A STORAGE-STABLE BROWN STOCK

(75) Inventors: Dieter Melwitz, Heilbronn (DE); Andrea Mueller, Heilbronn (DE); Herman Schmid, Heilbronn (DE)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 329 days.

(21) Appl. No.: 10/141,014

(22) Filed: May 8, 2002

(65) Prior Publication Data

US 2002/0168461 A1 Nov. 14, 2002

(30) Foreign Application Priority Data

May 8, 2001 (DE) .......................................... 101 22 244

(51) Int. Cl.[7] .................................................. A23L 1/40
(52) U.S. Cl. ........................ 426/576; 426/589; 426/599; 426/641; 426/456; 426/466; 426/471; 426/523
(58) Field of Search ................................ 426/576, 584, 426/599, 641, 443, 455–456, 465–466, 471, 523

(56) References Cited

U.S. PATENT DOCUMENTS

| | | | |
|---|---|---|---|
| 3,769,042 A | | 10/1973 | Halik et al. .................. 426/326 |
| 4,060,645 A | * | 11/1977 | Risler et al. ................. 426/302 |
| 4,597,974 A | * | 7/1986 | Fonteneau et al. ........... 426/129 |
| 6,632,468 B2 | * | 10/2003 | Morgan et al. ............. 426/573 |

FOREIGN PATENT DOCUMENTS

| | | |
|---|---|---|
| DE | 75226 | 5/1970 |
| DE | 132 634 | 10/1978 |
| DE | 42 33 762 | 4/1993 |
| FR | 806 946 A | 12/1936 |
| GB | 2202725 A | * 10/1988 |
| WO | 87/01912 A | 4/1987 |
| WO | 98/09539 | 3/1998 |

OTHER PUBLICATIONS

SU 1517913A, Database WPI, Derwent Pub., Class D13, AN 1990–252178, XP002213226, Oct. 30, 1989, abstract.
SU 1565470A, Database WPI, Derwent Pub., Class D13, AN 1991–020569, XP002213227, May 23, 1990, abstract.

* cited by examiner

Primary Examiner—Drew Becker

(57) ABSTRACT

The invention relates to a process for preparing a storage-stable brown stock from meat extract and vegetable juice and other customary additives. In a first reaction, a liquid mixture having a solids content of 65–85%, preferably 75–80% by weight, of meat extract, gelatin and vegetable concentrate with or without other customary additives is allowed to react at a temperature around boiling point, preferably 90–100° C., for 3–20 minutes, preferably 5–15 minutes. In a cooking step, a soup stock is added to the product of the prior reaction and, after dilution to a solids content of 10–45% by weight, preferably 15–35% by weight, the mixture is cooked for 40–180 minutes, preferably 50–80 minutes, at a temperature around boiling point, preferably 90–100° C. The product is concentrated to a solids content of at least 60% by weight, preferably 70% or more. The end product can be dried to give a pulverant dry product.

9 Claims, No Drawings

PROCESS FOR PREPARING A STORAGE-STABLE BROWN STOCK

The invention relates to a process for preparing a storage-stable brown stock from meat extract and vegetable juice.

BACKGROUND OF THE INVENTION

Culinary preparation of a classic brown stock (Fond brun, demi glace) is a very time-consuming process and also requires experience and skill on the part of the respective chef; precise attention must be paid to selection and quality of the raw materials. Such a stock can be kept for only a few days under refrigeration. From classic cuisine, it is known that a stock can be concentrated by slow reduction to the extent that it can be kept for several months without refrigeration; this product is termed "Glace (de viande)". It is not surprising that a stock is prepared only rarely in private households.

Preparation of a classic culinary stock requires, in particular, bones from meat, vegetables and spices. The preparation process is complex: roasting the bones and vegetables, deglazing with wine or water, reducing, adding water, boiling for several hours, repeated addition of water, filtering off the solids and reducing.

It appears to be virtually impossible to standardize this process for purposes of industrial manufacture, since the raw materials differ in quality and even roasting on an industrial scale is not possible.

The object of the invention is to prepare a stock industrially and to provide a process for preparing a storage-stable brown stock.

Surprisingly, it has been found that it is possible to replace the individual components by standardized industrial raw materials and, by means of the inventive process, to prepare a sauce base which is comparable to a home-made one.

DD-PS 132634 describes a process for preparing a sauce base stock in which bones (cleared from meat) of a particle size between 6 and 10 mm with added fats or oils and spices are browned at temperatures between 190 and 210° C., after which, with addition of water, there follows a reducing operation to be carried out repeatedly at about 120° C. and then a cooking operation also proceeding at 120° C. This process, as a result of the roasting step, is difficult to standardize and does not lead to satisfactory organoleptic results. WO 87/01912 describes the preparation of a meat sauce base which can only be preserved by sterilization and needs to be further processed by the consumer. DE 4233762 A1 describes a process for preparing a sauce base stock from bones and vegetables, with the bones first needing to be comminuted and then, with addition of fat, browned, then the browned pieces being boiled in water for more than 10 hours, the resultant broth, after filtration, being mixed with a vegetable broth and the mixture of broths being concentrated to a solids content of 15–20%. This broth concentrate must then be sterilized, homogenized and aseptically packaged.

Against standardization of such a process is the fact that meat-bearing bones can differ in quality and the roasting operation, owing to the varying raw material quality, proceeds variably and cannot be performed to lead to uniform optimum results.

The inventive process makes it possible to prepare a stock which corresponds in quality to that of a classic stock, but can be kept for several months at room temperature, and does not require sterilization for long shelf life. In addition, the process is characterized by a significantly shorter processing time and the raw materials used are available on the market in sufficient amount and in standardized qualities.

SUMMARY OF THE INVENTION

The inventive process is characterized in that a) in a prior reaction, a liquid mixture having a solids content of 65–85% by weight, preferably 75–80% by weight, is prepared by mixing 1–40% (preferably 2–25%) meat extract, 1–30% (preferably 2–20%) gelatin and 5–70% (preferably 10–50%) vegetable juice concentrate with or without other customary additives, which mixture is allowed to react at a temperature around boiling point, preferably 90–100° C., for 3–20 minutes, preferably 5–15 minutes, then b) in a cooking step, a soup stock is added to the product of the prior reaction and, after dilution to a solids content of 10–45% by weight, preferably 15–35% by weight, the mixture is cooked for 40–180 minutes, preferably 50–80 minutes, at a temperature around boiling point, preferably 90–100° C., whereupon c) the product is concentrated to a solids content of at least 60% by weight, preferably 70% by weight or above.

DETAILED DESCRIPTION OF THE INVENTION

The individual process steps and their sequence are essential for the success of the inventive process. Without the prior reaction the product lacks a roast flavor, it tastes of the individual components and the typical sauce taste is absent.

From the energy point of view, it appears contradictory to dilute the concentrated raw materials for the cooking step and to concentrate them again subsequently, but without this cooking step at a low solids content, the desired taste balance is lacking from the product: the product only tastes roasted and of the individual constituents, but it lacks the rounded and harmonious organoleptic profile.

The prior reaction is expediently carried out in a tube heater. It is not impossible also to carry out the prior reaction under pressure, higher temperatures then also being able to be used.

According to the invention, instead of the meat-bearing bones, the substances extracted from these, that is to say meat extract and gelatin, are used, and instead of the fresh vegetables, vegetable juice concentrates are used. Thus the Maillard reaction can be standardized.

Addition of gelatin is important not only to achieve the appropriate mouthfeel, but is also necessary to achieve the optimum flavor profile. It has proved to be expedient to add the gelatin in an amount of 0.5 to 0.8 parts by weight per 1 part by weight of meat extract.

For targeted control of the Maillard reaction, expediently, in addition, various reducing sugars, in particular dextrose, are added. It has proved to be advantageous to add, per 1 part by weight of meat extract, 1–1.5 parts by weight of reducing sugars.

To round off the taste, it is further advantageous to add cooking salt, glutamate, tomato puree and/or wine extract.

After the prior reaction, a soup stock is added to the product. A soup stock is a product known to those skilled in the art which is obtained by boiling bones. The product is then diluted, preferably with water, and subjected to a cooking step. This cooking step is an important step to achieve the desired flavor profile as exhibited by a classically prepared stock.

In this cooking step, spices can be added to further round off the taste.

The cooking step is expediently carried out in a jacketed cooking vessel.

The product from the cooking is then concentrated by means of a suitable evaporator to a concentration corresponding to a water activity of 0.65 to 0.75; this is generally the case at a solids content of 60–70% by weight. At this water activity, the product can be kept for several months without cooling or addition of additives.

Suitable evaporators are falling-film evaporators and thin-film evaporators.

The resultant pasty end product can further be converted into a pulverulent dry product, for example by vacuum drying or microwave vacuum drying.

EXAMPLES

Example 1

A mixture having a solids content of 75% by weight, of 30 parts of meat extract, 20 parts of gelatin, 40 parts of dextrose, 30 parts of carrot juice concentrate, 68 parts of leek juice concentrate, 48 parts of salt, 34 parts of celery juice concentrate, 50 parts of onion juice concentrate, 60 parts of tomato puree, 60 parts of red wine extract and 40 parts of glutamate is given a prior reaction in a tube heater for 6 min at 99° C. Then, 106 parts of soup stock, 0.7 parts of spices (cloves, bay leaf, pepper, thyme, rosemary) and 875 parts of water are added, so that a solids content of 30% by weight is obtained and this product is cooked in a cooking vessel at 100° C. for 60 minutes. The product is then concentrated in a single stage in a thin-film evaporator from approximately 30% DM to 66% DM. When 80–100 grams of this concentrate are boiled with 1 liter of water, a sauce base is obtained which corresponds in flavor and consistency to a classically prepared stock.

Example 2

A mixture having a solids content of 80% by weight of 27 parts of meat extract, 18 parts of gelatin, 36 parts of dextrose, 27 parts of carrot juice concentrate, 62 parts of leek juice concentrate, 62 parts of salt, 31 parts of celery juice concentrate, 46 parts of onion juice concentrate, 54 parts of tomato puree and 36 parts of glutamate is given a prior reaction in a tube heater for 6 min at 99° C. Then, 100 parts of soup stock, 0.6 parts of spices (cloves, bay leaf, pepper, thyme, rosemary) and 831 parts of water are added, and the mixture is cooked in a cooking vessel at 100° C. for 60 minutes. The product is then concentrated in a single stage in a thin-film evaporator from approximately 28% DM to 60% DM. This product also corresponds, after redilution to 1 liter, in flavor and consistency to a classically prepared stock. Since it is prepared without red wine extract, it permits more versatile applications.

Example 3

A mixture having a solids content of 78% by weight of 30 parts of meat extract, 40 parts of dextrose, 30 parts of carrot juice concentrate, 68 parts of leek juice concentrate, 48 parts of salt, 34 parts of celery juice concentrate, 50 parts of onion juice concentrate, 60 parts of tomato puree, 60 parts of red wine extract and 40 parts of glutamate is given a prior reaction in a tube heater for 6 min at 99° C. Then, 110 parts of soup stock, 0.7 parts of spices (cloves, bay leaf, pepper, thyme, rosemary) and 875 parts of water are added, and the mixture is cooked in a cooking vessel at 100° C. for 60 minutes. The product is then concentrated in a single stage in a thin-film evaporator from approximately 30% DM to 66% DM. After redilution, this product did not comply with the requirements with respect to flavor and consistency. This example illustrates the importance that the substances extracted from the bones and the collagen raw materials have for the flavor and consistency of a good-tasting stock.

Example 4

30 parts of meat extract, 20 parts of gelatin, 40 parts of dextrose, 30 parts of carrot juice concentrate, 68 parts of leek juice concentrate, 48 parts of salt, 34 parts of celery juice concentrate, 50 parts of onion juice concentrate, 60 parts of tomato puree, 60 parts of red wine extract and 40 parts of glutamate are mixed to form a mixture having a solids content of 75% by weight and, without prior reaction, are cooked together with 106 parts of soup stock, 0.7 parts of spices (cloves, bay leaf, pepper, thyme, rosemary) and 875 parts by water in a cooking vessel at 100° C. for 3 hours. The product is then concentrated in a single stage in a thin-film evaporator from approximately 30% DM to 66% DM. The product lacks the typical roasted flavor of a stock, it has an inharmonious and raw taste.

Example 5

30 parts of meat extract, 20 parts of gelatin, 40 parts of dextrose, 30 parts of carrot juice concentrate, 68 parts of leek juice concentrate, 48 parts of salt, 34 parts of celery juice concentrate, 50 parts of onion juice concentrate, 60 parts of tomato puree, 60 parts of red wine extract and 40 parts of glutamate are mixed with 106 parts of soup stock, 0.7 parts of spices (cloves, bay leaf, pepper, thyme, rosemary). An attempt was made to subject this mixture, which had a solids content of 78% by weight, to a prior reaction in the tube heater at 99° C. for 6 minutes. This did not succeed, the product "burns on" immediately and exhibits a corresponding flavor profile.

What is claimed is:

1. Process for preparing a storage-stable brown stock from meat extract and vegetable juice and other customary additives, characterized in that a) in a first reaction, a liquid mixture having a solids content of 65–85% by weight, is prepared by mixing 1–40% meat extract, 1–30% gelatin and 5–70% vegetable juice concentrate with or without other customary additives, which mixture is allowed to react at a temperature around boiling point, for 3–20 minutes, then b) in a cooking step, a soup stock is added to the product of the first reaction and, after dilution to a solids content of 10–45% by weight, the mixture is cooked for 40–180 minutes, at a temperature around boiling point, whereupon c) the product is concentrated to a solids content of at least 60% by weight.

2. Process according to claim 1, characterized in that, in the first reaction (a), reducing sugars, are added.

3. Process according to claim 1, characterized in that 0.5–0.8 parts by weight of gelatin are added per 1 part by weight of meat extract.

4. Process according to claim 1, characterized in that 1–1.5 parts by weight of reducing sugars are added per 1 part by weight of meat extract.

5. Process according to claim 1, characterized in that the first reaction is carried out in a tube heater.

6. Process according to claim 1, characterized in that the dilution for the cooking step is effected by adding water.

7. Process according to claim 1, characterized in that the product is concentrated in process stage c) by means of a falling-film evaporator or thin-film evaporator.

8. Process according to claim 1, characterized in that the end product is dried to give a pulverulent dry product.

9. Process according to claim 8, characterized in that the drying is carried out by means of vacuum drying or microwave vacuum drying.

* * * * *